(12) United States Patent
Saraiva et al.

(10) Patent No.: US 10,159,183 B2
(45) Date of Patent: Dec. 25, 2018

(54) AUTOMATED SYSTEM FOR COUPLING A HARVESTING HEADER DRIVETRAIN

(71) Applicants: AGCO do Brasil, Canoas (BR); AGCO International GmbH, Neuhausen (CH)

(72) Inventors: Daniel Saraiva, Sao Luiz-Canoas (BR); Jakob Bro Sørensen, Randers (DK); Airton Solimar Walter, Nova Sant Rita (BR); Henning Sorensen, Randers (DK)

(73) Assignees: AGCO DO BRASIL SA LTDA, Ribeireo Preto, Sao Paulo (BR); AGCO Interenational GmbH, Neuhausen (CH)

( * ) Notice: Subject to any disclaimer, the term of this patent is extended or adjusted under 35 U.S.C. 154(b) by 0 days.

(21) Appl. No.: 15/739,328

(22) PCT Filed: Jun. 8, 2016

(86) PCT No.: PCT/IB2016/000804
§ 371 (c)(1),
(2) Date: Dec. 22, 2017

(87) PCT Pub. No.: WO2016/207708
PCT Pub. Date: Dec. 29, 2016

(65) Prior Publication Data
US 2018/0168102 A1    Jun. 21, 2018

(30) Foreign Application Priority Data
Jun. 22, 2015  (GB) .................................. 1510914.3

(51) Int. Cl.
*A01D 41/16* (2006.01)
*A01D 41/14* (2006.01)

(52) U.S. Cl.
CPC ........... *A01D 41/16* (2013.01); *A01D 41/142* (2013.01)

(58) Field of Classification Search
CPC ...... A01D 41/16; A01D 41/142; A01D 69/00; A01B 71/063; B60K 25/06
See application file for complete search history.

(56) References Cited

U.S. PATENT DOCUMENTS 3,324,637 A * 6/1967 Windsor ................. A01D 41/16
                                                          56/15.6
4,266,395 A * 5/1981 Basham ............... A01D 75/287
                                                          56/16.2
(Continued)

FOREIGN PATENT DOCUMENTS

EP    1884151 A1    2/2008
EP    1985168 A1    10/2008
(Continued)

OTHER PUBLICATIONS

UK Intellectual Property Office, International Search Report for priority Application No. 1510914.3, dated Nov. 30, 2015.
(Continued)

*Primary Examiner* — Arpad Fabian-Kovacs

(57) ABSTRACT

A header drivetrain coupling system including a harvester driveline mounted to a harvesting vehicle and a header driveshaft mounted to a detachable header. The harvester driveline is supported for rotation at an inboard end on a feederhouse and at an outboard end on a header tilt frame even when the header is detached therefrom. The harvester driveline comprises a telescopic portion which permits a coupling member on the outboard end to be moved into and out of engagement with a coupling member on the header driveshaft. A sliding support assembly is provided to support a bearing housing which holds the outboard end of the harvester driveline on the tilt frame. An actuator is config-
(Continued)

ured to move the bearing housing with respect to the tilt frame to selectively engage and disengage the coupling members.

15 Claims, 7 Drawing Sheets

(56) References Cited

U.S. PATENT DOCUMENTS

| | | | | |
|---|---|---|---|---|
| 4,542,785 A * | 9/1985 | Bagnall | ............... | F01P 11/06 |
| | | | | 165/119 |
| 6,182,427 B1 | 2/2001 | Loehr | | |
| 6,519,923 B1 * | 2/2003 | Cooksey | ............... | A01B 71/08 |
| | | | | 56/14.9 |
| 7,234,291 B2 | 6/2007 | Rickert | | |
| 7,497,459 B2 * | 3/2009 | Johnson | ............... | A01D 41/16 |
| | | | | 280/515 |
| 7,552,578 B2 * | 6/2009 | Guske | ............... | A01B 71/063 |
| | | | | 56/14.9 |
| 8,079,204 B2 * | 12/2011 | Coers | ............... | A01D 41/14 |
| | | | | 56/15.8 |
| 8,973,344 B2 * | 3/2015 | Ritter | ............... | A01B 71/063 |
| | | | | 56/15.3 |
| 9,043,954 B2 * | 6/2015 | Ritter | ............... | A01B 71/063 |
| 9,743,588 B2 * | 8/2017 | Dreer | ............... | A01D 67/005 |
| 2002/0005033 A1 * | 1/2002 | Uhlending | ............... | A01D 75/287 |
| | | | | 56/10.2 R |
| 2004/0187461 A1 * | 9/2004 | Rickert | ............... | A01D 69/00 |
| | | | | 56/14.2 |
| 2008/0006014 A1 | 1/2008 | Guske | | |
| 2008/0256914 A1 | 10/2008 | Ricketts et al. | | |
| 2008/0271425 A1 * | 11/2008 | Ricketts | ............... | A01D 41/16 |
| | | | | 56/15.6 |
| 2012/0317951 A1 * | 12/2012 | Vereecke | ............... | A01D 41/16 |
| | | | | 56/14.9 |
| 2013/0219846 A1 * | 8/2013 | Verhaeghe | ............... | A01D 41/16 |
| | | | | 56/16.4 R |
| 2014/0237971 A1 | 8/2014 | Ritter et al. | | |
| 2014/0378236 A1 | 12/2014 | Ritter et al. | | |
| 2015/0373910 A1 * | 12/2015 | Surmann | ............... | A01D 69/06 |
| | | | | 56/14.5 |
| 2016/0057934 A1 * | 3/2016 | Dreer | ............... | A01D 41/142 |
| | | | | 56/13.5 |
| 2016/0278276 A1 * | 9/2016 | De Coninck | ............... | A01B 63/004 |
| 2016/0360698 A1 * | 12/2016 | Ducroquet | ............... | A01D 41/16 |

FOREIGN PATENT DOCUMENTS

| | | |
|---|---|---|
| EP | 2818035 A1 | 12/2014 |
| WO | 2011/095525 A1 | 8/2011 |
| WO | 2014/173617 A1 | 10/2014 |

OTHER PUBLICATIONS

European Patent Office, International Search Report for parent International Application No. PCT/IB2016/000804, dated Aug. 23, 2016.

* cited by examiner

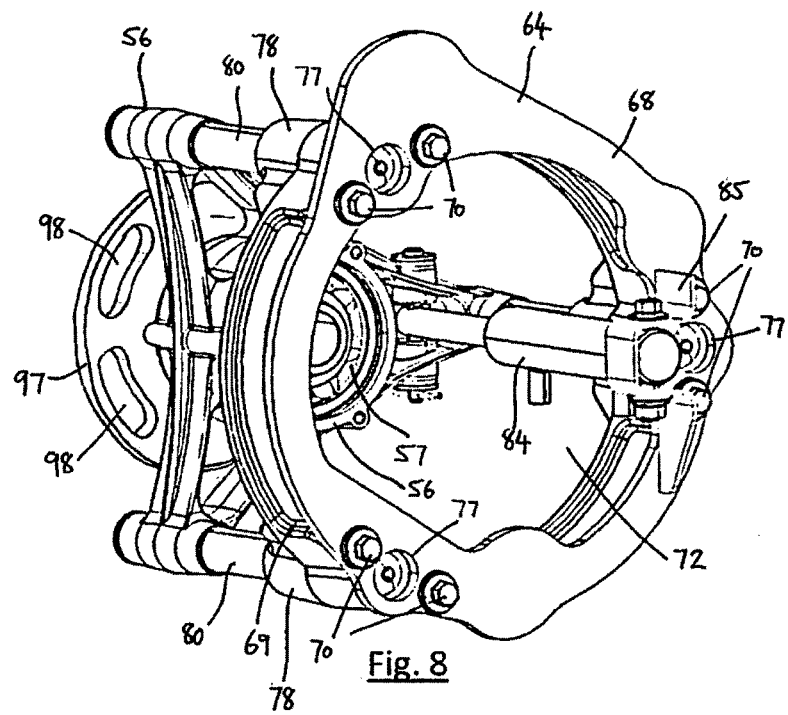
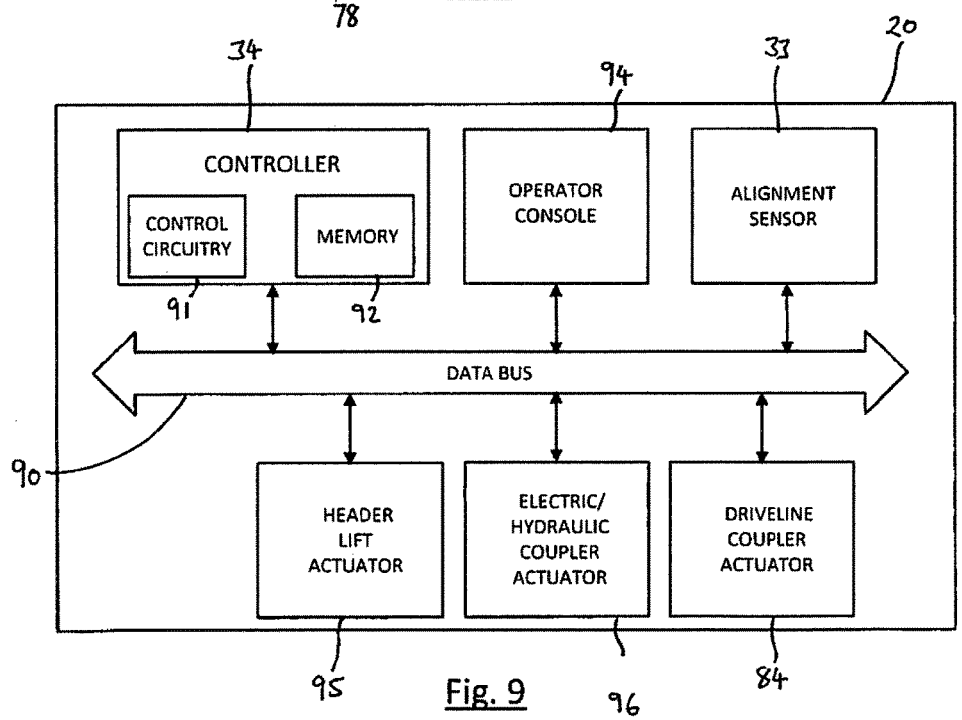
Fig. 8
Fig. 9

AUTOMATED SYSTEM FOR COUPLING A HARVESTING HEADER DRIVETRAIN

BACKGROUND OF THE INVENTION

Field of Invention

The invention relates to agricultural harvesters and particularly to systems for automatically coupling and uncoupling the drivetrain of a detachable header without the requirement for an operator to leave the driver's cab.

Description of Related Art

Headers for combine harvesters and other self-propelled harvesting machines typically include a cutting mechanism and feeding apparatus which are driven by a drivetrain connected to a torque source on the harvesting machine. To facilitate removal of the header from the harvester, for the purpose of transport for example, the drivetrain can be split by a coupling arrangement wherein a harvester driveline supported on the harvester is separated from a header driveshaft supported on the header.

Driven by the use of wider headers, tilt frames are commonly used today to mount the header onto the front of the feederhouse, the tilt frame allowing the header to tilt and/or pitch with respect to the feederhouse in order to follow variation in the ground contours. To cater for movement of the header with respect to the feederhouse it is known to support the drivetrain on the tilt frame which remains in a fixed positional relationship with respect to the header, such as that disclosed in U.S. Pat. No. 7,234,291. It should be appreciated that, in this case, a degree of flexibility must be provided in the driveline upstream to cater for movement of the tilt frame with respect to the feederhouse and the harvester main frame. In U.S. Pat. No. 7,234,291 this flexibility is enabled by use of a longitudinal drive shaft extending parallel to the feederhouse, the drive shaft being mounted with universal joints at both ends.

Recent advances by the manufacturers of harvesting machinery have produced various mechanisms that facilitate automatic coupling and uncoupling of the harvester driveline and the header driveshaft to avoid the requirement of the operator to leave the cab and thereby speeding up the process of attaching and detaching the header between harvesting operations.

U.S. Pat. No. 7,552,578 discloses an automatic coupling device which includes a gearbox having two jack shafts, one of which is connected to a telescopic jack shaft and an actuator for outwardly sliding the gearbox and telescopic shaft apart. The gearbox is slideably mounted to the tilt frame so as to exploit the fixed positional relationship with the header as described above for reliable alignment of the respective shafts.

US-2013/0219846 discloses another example of an automatic coupling mechanism wherein a cam mechanism attached to the feederhouse serves to maintain a space in between the feederhouse and the header when initially picked up. An actuator rotates the cam to slowly reduce the spacing. Hooks having a fixed positional relationship with the cam latch onto a bar or pin on the header. The drive coupling comprises two halves which are brought together in the longitudinal direction as the space in between the header and the feederhouse is closed.

There is a continued desire to develop simple and robust solutions for automatic drivetrain coupling mechanisms which cater for headers mounted on tilt frames.

SUMMARY OF INVENTION

It is an object of the invention to provide a system for automatically coupling and uncoupling a harvester header drivetrain which is simple and robust.

It is a further object of the invention to provide a low cost automatic coupling system.

According to the invention there is provided a system for automatically coupling and uncoupling a harvesting header drivetrain comprising:

a feederhouse mounted to a harvester main frame;

a tilt frame mounted to a front side of the feederhouse to permit movement of the tilt frame relative to the feederhouse when in operation;

a header being releasably mounted to the tilt frame;

a drivetrain comprising a harvester driveline supported for rotation at an inboard end on the feederhouse and at an outboard end on the tilt frame when the header is detached from the tilt frame, and a header driveshaft driven by the harvester driveline and supplying power to the header, the header driveshaft being mounted for rotation on the header;

the outboard end of the harvester driveline being supported on the tilt frame by a sliding support assembly which comprises a bearing housing which is slideably mounted to the tilt frame to permit linear movement of the bearing housing with respect to the tilt frame in a direction generally parallel to the axis of the header driveshaft, the bearing housing holding a first bearing which supports said outboard end in rotation;

the header driveshaft and the outboard end of the harvester driveline each comprising a respective coupling which mutually engage when brought together;

the harvester driveline comprising a telescopic driveshaft and a pair of universal joints; and, an actuator arranged to move the bearing housing with respect to the tilt frame to selectively engage and disengage the couplings.

The outboard end of the harvester drive line is supported on the tilt frame by a sliding support assembly. An actuator is arranged to slide the outboard end with respect to the tilt frame so as to control the separation between the respective couplings. By mounting the bearing housing associated with the harvester driveline on the tilt frame in this way, accurate alignment between such and the header driveshaft can be achieved. Furthermore, tilting of the header with respect to the feederhouse during operation does not affect the forces associated with the coupling.

Movement of the header with respect to the feeder house is accommodated by a degree of flexibility in at least a portion of the harvester driveline between the inboard end thereof mounted with respect to the feederhouse and the outboard end thereof mounted with respect to the tilt frame.

Conveniently the actuator can be controlled from a user interface device located in the driver's cab. Once alignment between the tilt frame and header is achieved, typically by attaching the header, then the actuator can be extended to connect the respective couplings.

Advantageously, the invention can be implemented with relatively cheap components without sacrificing the robustness of the coupling mechanism. For example, there is no need for sliding gearboxes which are expensive and prone to alignment issues.

In one embodiment the bearing support is mounted to the tilt frame by a plurality of sliding support members or arms which may include a crank section to offset the bearing housing (and alignment axis) rearwardly from the header. Although the bearing support is preferably mounted to the tilt frame by three parallel sliding support members, it is envisaged that more or less support members may be employed.

Each sliding support member may be telescopic and comprise an inner member fixed to the bearing support and being slideably received in a respective sleeve carried by the tilt frame. In an example arrangement the sliding support members are tubular wherein an inner tube fixed with respect to the bearing member is slideably received in an outer tube fixed with respect to the tilt frame. In another example, the bearing housing may be supported on the tilt frame by a cast body, wherein the bearing housing is mounted to the cast body so as to have a mutually sliding relationship.

In one embodiment the sliding support assembly comprises a support hub which is mounted to the tilt frame in a fixed positional relationship therewith, wherein the bearing housing is mounted to the support hub in a variable translational relationship along the hub axis. The support hub may comprise a central bore which receives a second bearing, wherein said telescopic drive shaft is supported at a first end by the first bearing and at a second end by the second bearing. In such an arrangement, the extensions of the harvester drive line required for the coupling operation is facilitated by a telescopic driveshaft arranged between the support hub and the bearing housing, the telescopic driveshaft remaining in the same alignment with respect to the header regardless of the tilt angle of the header. In this embodiment, the harvester driveline may further comprise an inboard driveshaft connected by a pair of universal joints between the telescopic driveshaft and a transverse driving stub shaft which is journaled to the feederhouse and driven by an engine of the harvester.

In an alternative embodiment, the telescopic driveshaft is supported at a first end by the first bearing and at a second end by a second bearing which is mounted in a fixed positional relationship with respect to the feederhouse, and wherein the telescopic driveshaft passes through an aperture provided in the support hub. In this arrangement the telescopic drive shaft is arranged so as to deliver both the required extension capability and the angular flexibility brought about by tilting of the tilt frame.

The actuator is preferably connected between the support hub and the bearing housing and serves to control the distance there between.

The tilt frame preferably defines a crop receiving opening which overlies a front inlet of the feederhouse, wherein the tilt frame is pivotable about a pendulous mounting point to permit adjustment of the lateral tilt of the header with respect to the feederhouse. The tilt frame may be pivotable with respect to the feederhouse around a pitch axis so as to permit adjustment of the pitch of the header when attached with respect to the feederhouse.

In one preferred embodiment the system further comprises a latch mechanism to latch the tilt frame to the header, a latch sensor to detect when the latch mechanism is successfully engaged, and a controller for controlling the actuator, wherein the controller is configured to receive a latch signal from the latch sensor, and wherein the controller commands extension of the actuator only when the latch signal is received.

BRIEF DESCRIPTION OF DRAWINGS

Further advantages of the invention will become apparent from reading the following description of specific embodiments with reference to the appended drawings in which:

FIG. 8 is a right rear perspective view of part of the system in accordance with the first embodiment of the invention showing the support hub and bearing housing in the extended position of FIG. 7 and showing the actuator;

FIG. 9 is a diagrammatic view of the system in accordance with the first embodiment of the invention;

DETAILED DESCRIPTION OF SPECIFIC EMBODIMENTS

In the foregoing description relative terms such as transverse, lateral, longitudinal, front and rear are made in relation to the normal forward direction of travel of the harvester described. The terms inboard and outboard are used in relation to a hypothetical longitudinal centre line of the harvester wherein an "outboard" end is further away from the centre line than an "inboard" end.

Figure 1:
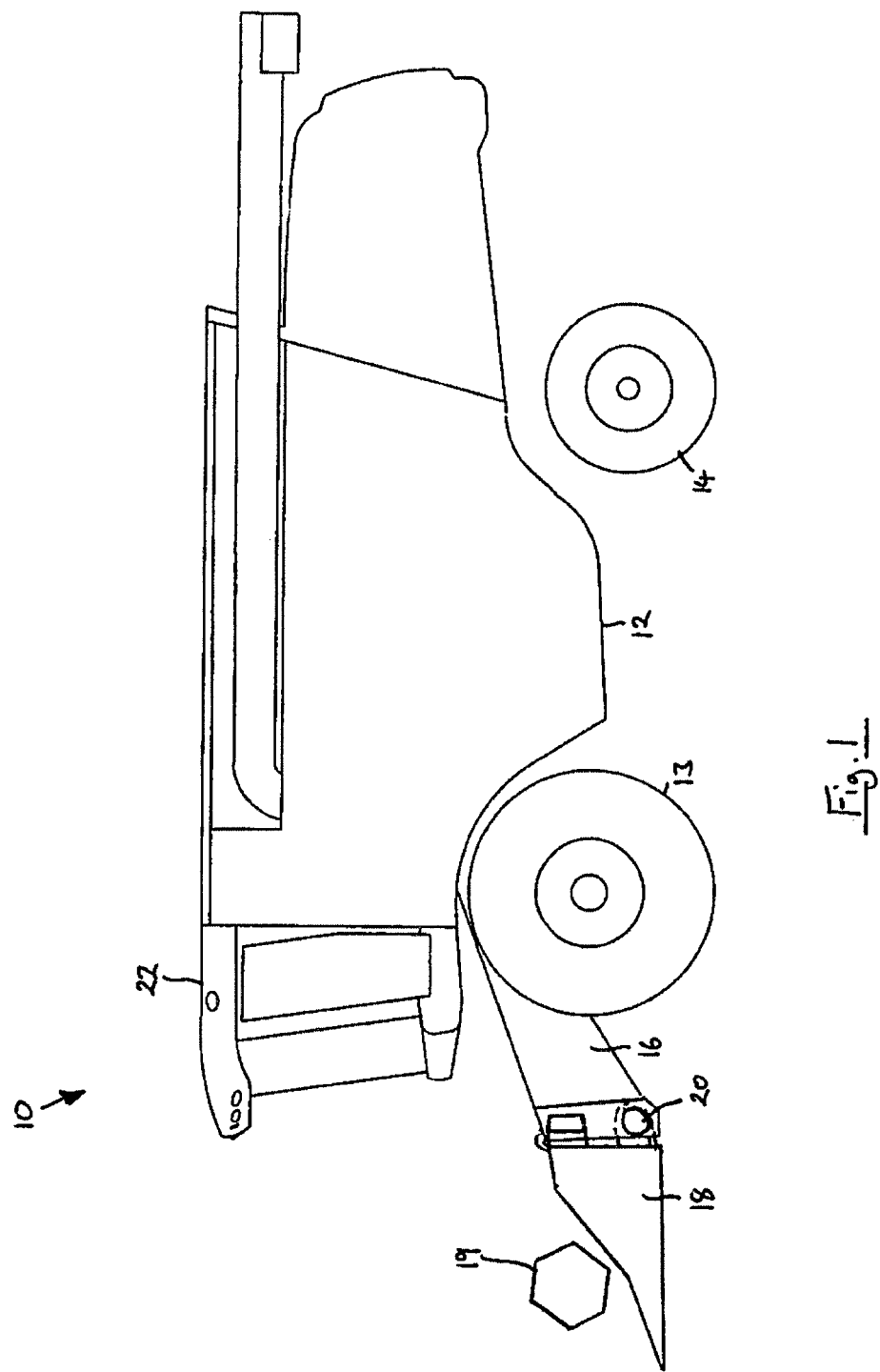
FIG. 1 is a schematic side view of a combine harvester with a detachable header suitable for embodying the invention.

With reference to FIG. 1 a combine harvester 10 comprises a main frame 12 which supports front wheels 13, rear steerable wheels 14 and a feederhouse 16. A crop gathering header 18 is detachably mounted to the front of feederhouse 16 and serves to cut and gather a standing crop and deliver the crop material to the feederhouse 16 through a central opening in the rear wall thereof. The combine harvester 10 comprises a header drivetrain coupling system 20 which will be described in more detail below. Also shown in FIG. 1 is a driver's cab 22.

Although described and illustrated as a cereal header for a combine harvester it will become apparent that the invention is also applicable to other types of header and harvester.

By way of example the harvester may be a self-propelled forage harvester or windrower whilst the header may be a corn header or a pick-up header.

Header 18 is mounted to the front of feederhouse 16 via a tilt frame 24 which is mounted to the feederhouse 16 in a manner which permits lateral tilt of the header 18 around a pendulous axis defined by pin 26 (FIG. 2) and pitch adjustment around a transverse axis in a known manner. The header 18 is mounted to the tilt frame 24 in a manner which maintains a fixed positional relationship and, in the example shown, includes a pair of hooks 28 fixed to the frame of header 18 which engage a corresponding pair or pins 29 provided on the tilt frame 24.

A latch mechanism in the form of retracting pins 30 secures a lower part of the tilt frame 24 to the frame of header 18. The fixed positional relationship between the header 18 and tilt frame 24 ensures that an opening in the rear wall of header 18 aligns with a crop material-receiving inlet 32 of tilt frame 24 which in itself overlies an inlet of feederhouse 16. Crop material passed there through is conveyed in a known manner by an elevator housed in the feederhouse 16.

A latch sensor 33 is provided to generate a latch signal when the pins 30 have successfully engaged with header 18. The latch sensor 33 is in electronic communication with electronic controller 34 either wirelessly or via a wiring harness.

Harvesting headers, as in this case, include moving components, such as a reel 19. The invention relates to the drivetrain which connects a torque source on the harvester to the moving systems and power consumers on the header. The header drivetrain coupling system 20 comprises a drivetrain 36 which includes a harvester driveline 38 associated with the harvester 10 and a header driveshaft 40 associated with the header 18. The drivetrain 36 serves to convey torque from a mechanical drive stage which ultimately derives torque from an engine (not shown) to the power consumers on the header 18 such as the reel, cutterbar and auger.

The harvester driveline 38 and header driveshaft 40 are selectively coupled by a coupling arrangement 42 to facilitate attachment and detachment of the header 18 from tilt frame 24.

Figure 2:
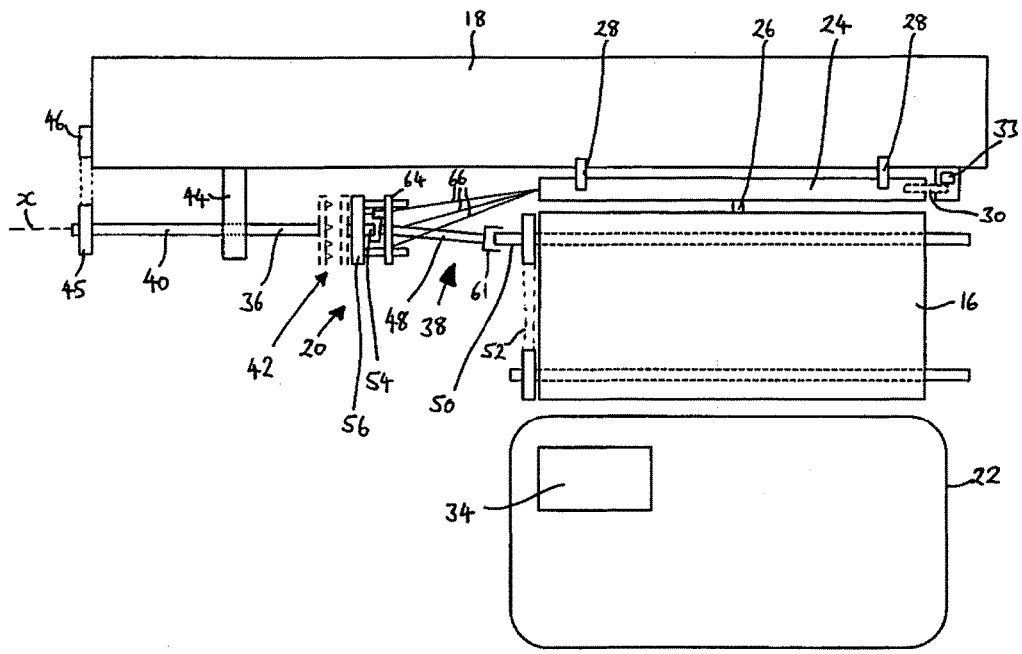
FIG. 2 is a schematic plan view of an automatic coupling system in accordance with a first embodiment of the invention.

FIG. 2 shows in highly schematic form the drivetrain coupling system 20 mounted on harvester 10, and specifically mounted to header 18 and feederhouse 16. Accompanying the schematic illustration of FIG. 2, FIGS. 3 to 9 show various parts of the coupling system 20 and like reference numerals will be used for common components throughout.

Header driveshaft 40 extends substantially transversely and is mounted for rotation on the header 18 by brackets 44 which include suitable bearings. An inboard end of header driveshaft 40 is associated with the coupling arrangement 42 whereas an outboard end of the header driveshaft 40 accommodates a drive sprocket or pulley 45 which powers a corresponding driven sprocket or pulley 46 for powering the header systems. The position of header driveshaft 40 remains substantially the same whether coupled or uncoupled from the harvester drive line 38.

In the first example embodiment illustrated in FIGS. 2 to 8 the harvester driveline 38 comprises a telescopic driveshaft 48 which is connected at its inboard end to a transverse driving stub shaft 50 which is itself journaled to the feederhouse 16 and driven ultimately from the engine via a chain and sprocket or belt drive represented at 52. It should be appreciated that the inboard end of drive shaft 48 may alternatively be connected to other drive mechanisms which are mounted with respect to feederhouse 16 without deviating from the scope of the invention. For example, the transverse driving stub shaft 50 may be replaced by a gearbox mounted to the side of feeder house 16 which transfers torque from a longitudinal drive shaft to a transverse drive shaft. Further alternatives will be envisaged by those skilled in the art.

The harvester driveline further comprises a short stub shaft 54 which is journaled to a bearing housing 56 by a bearing 57. Bearing housing 56 will be described in more detail below but is mounted to the tilt frame 24 by a sliding support assembly designated 60. The outboard end of telescopic driveshaft 48 is connected to the stub shaft 54.

Telescopic drive shaft 48 is connected at each end to the respective stub shafts 50,54 by universal joints which accommodate non-alignment of the respective stub shafts for reasons to become apparent below.

The sliding support assembly 60 serves to mount the bearing housing 56 to the tilt frame 24 in a manner which permits linear translational movement of the bearing housing with respect to the tilt frame in a direction which is generally parallel to the axis of the header driveshaft 40 or indeed the axis 'x' along which the coupling 42 operates. The sliding support assembly 60 comprises a support hub 64 which is mounted to the tilt frame 24 in a fixed positional relationship therewith by three rigid tubular arms 66.

The support hub 64 comprises a ring shaped plate 68 and a cast hub member 69 bolted to the plate 68 by bolts 70 best seen in FIG. 8. Together the plate 68 and hub member 69 define a central opening 72 through which the telescopic shaft 48 passes to access the bearing housing 56.

The tubular arms 66 are welded at their respective outboard ends to the exposed inboard face of plate 68, the arms 66 being mounted in a circumferentially spaced relationship around the plate 68 to spread the load thereof. Fillet plates 73 are provided at the joint between the arms 66 and plate 68 for added strength but may be omitted. The arms 66 are mounted at their inboard ends to the tilt frame 24 in a vertically spaced relationship as best seen FIGS. 3 and 7. The arms 66 may be mounted by welding to a U-section mounting bracket 74 which is then bolted to the side of the tilt frame 24 for convenience in assembly. The arms 66 are shaped with elbows to provide a crank so that they can be mounted as described yet provide a longitudinal offset between the coupling axis x and the lateral plane of the tilt frame 24.

Hub member 69 has cast therein three bosses 76 which align with corresponding holes 77 cut into the plate 68 which mates therewith. Boss extension members 78 are welded to the outboard face of hub member 69 so as to effectively extend the bore provided by the bosses 76. Rigid support rods 80 are slidingly received in the bosses 76, the rods 80 being fixed at their respective outboard ends inside bores provided in the cast bearing housing 56, wherein bolts 81 secure the rods 80 inside their respective bores.

Figure 3:
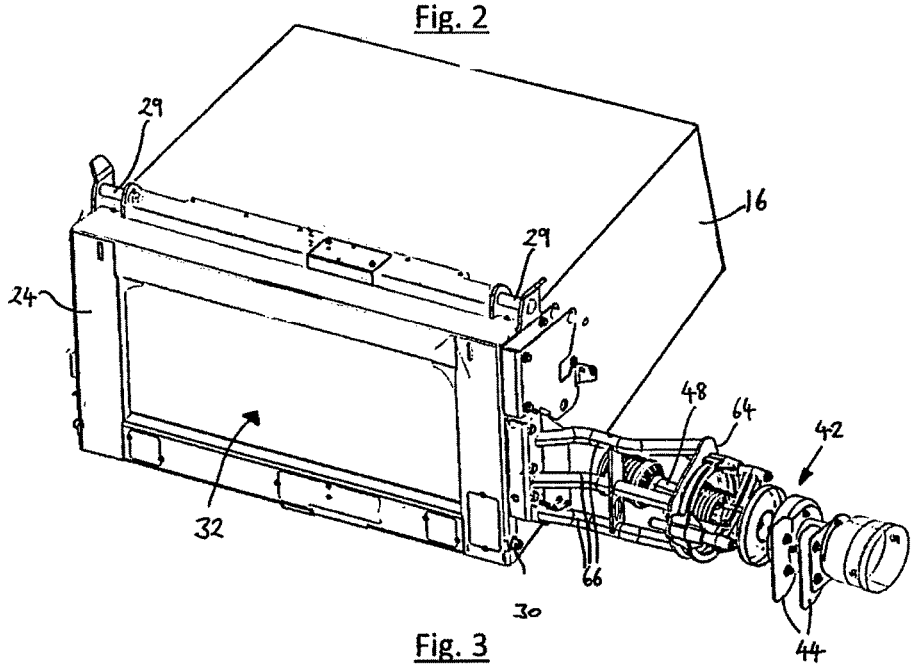
FIG. 3 is a front left perspective view of the coupling system of FIG. 2 showing the header removed for sake of clarity.
Figure 4:
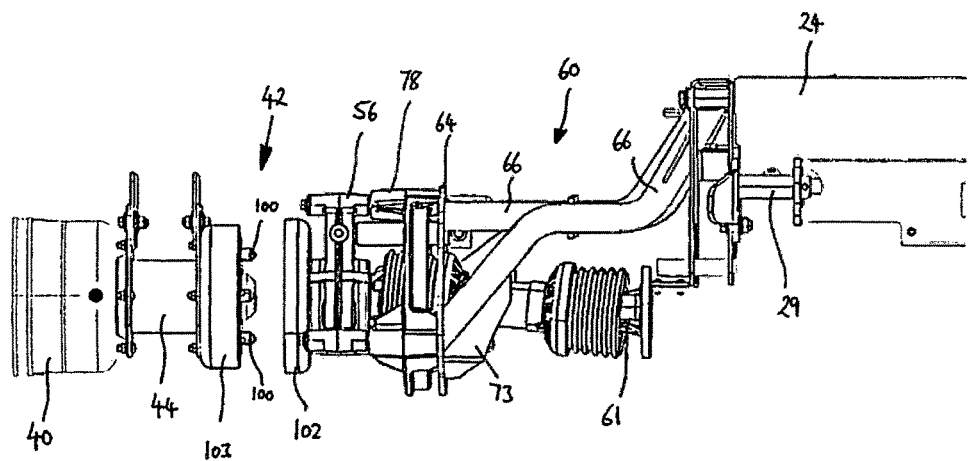
FIG. 4 is a plan view of the coupling system in accordance with the first embodiment of the invention shown with the couplings in an uncoupled position.
Figure 5:
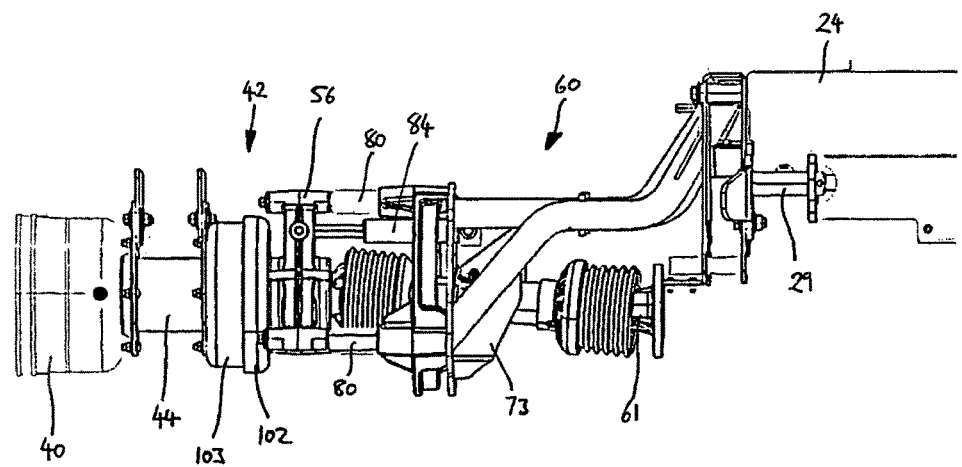
FIG. 5 is a plan view of the first embodiment of the invention shown with the couplings in a coupled position.
Figure 6:
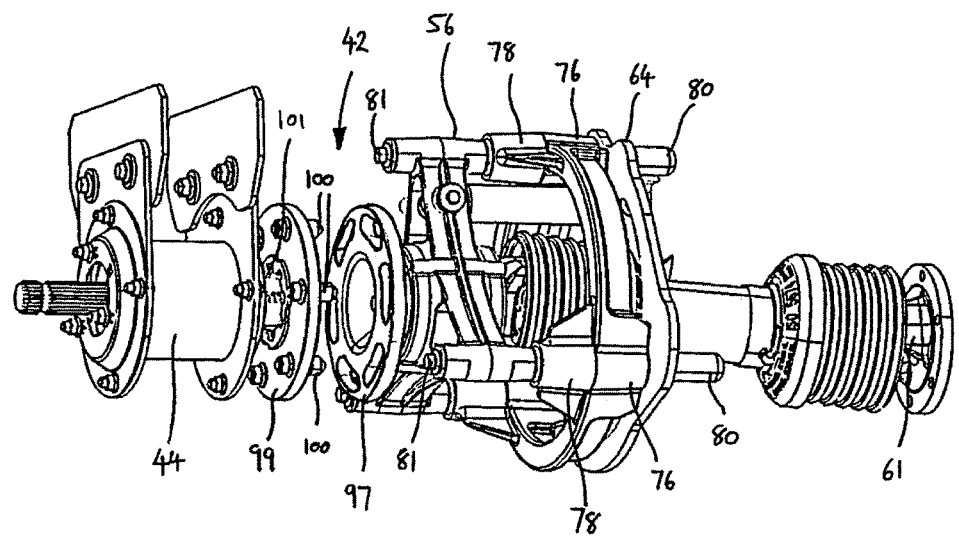
FIG. 6 is a left rear fragmentary view of the coupling system in accordance with the first embodiment with some components omitted to reveal the workings of the coupling mechanism and shown with the couplings in an uncoupled position.
Figure 7:
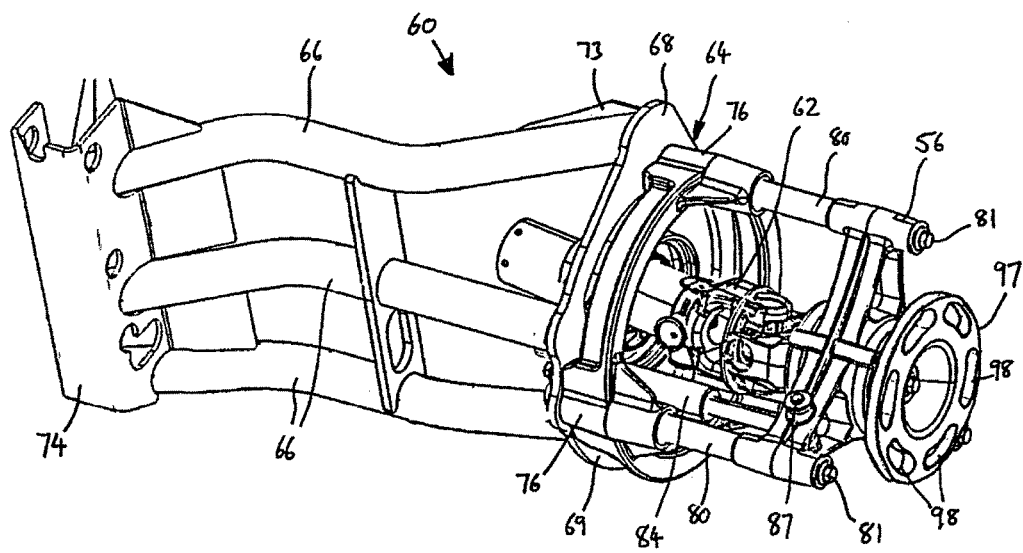
FIG. 7 is a front left perspective view of part of the system in accordance with the first embodiment of the invention showing the bearing housing in an extended position corresponding to the coupled position of FIG. 5.

Bearing housing 56 is therefore slideably mounted to the support hub 64 in a manner which allows the bearing housing 56 to slide in a direction parallel and co-axial with axis X. FIGS. 3, 4 and 6 show the bearing housing 56 displaced fully to the right and abutting the boss extensions 78, this position corresponding to an uncoupled position. FIGS. 5, 7 and 8 show the bearing housing 56 displaced fully to the left which corresponds to a coupled position.

The system 20 further comprises a hydraulic actuator 84 which is connected between the support hub 64 and the bearing housing 56 wherein the actuator serves to move the bearing housing 56 with respect to the support hub 64 (and the tilt frame 24) to selectively engage and disengage the coupling mechanism 42. The actuator 84 is bolted at its inboard end to a bracket 85 which is welded to the exposed face of plate 68 as best seen in FIG. 8. The cylinder 84 passes through aperture 72 and is connected at its other end to bearing housing 56 by a bolt 87 which passes through a hole formed in the bearing housing 56. The actuator in this embodiment is configured to move the bearing housing 56 into the coupled position by extension and into the uncoupled position by retraction.

It should be appreciated that the actuator 84 can be configured in alternative ways so as to control movement of bearing housing 56 with respect to tilt frame 24. For example the actuator may be connected directly between the tilt frame 24 and the bearing housing 56.

The hydraulic actuator 84 is connected to appropriate control valves (not shown) by hydraulic pipes wherein the electrohydraulic valves are connected to controller 34 via a data bus 90 as shown in FIG. 9.

For completeness, controller 34 comprises control circuitry 91 and memory 92 and is in communication with an operator's console 94 via data bus 90. The controller 34 may also be in communication with the control valves associated with a header lift actuator 95 and an electric or hydraulic coupling actuator 96.

Turning attention to the coupler 42, the stub shaft 54 supported for rotation in bearing housing 56 has fixed on its outboard end an annular coupling plate 97 which has elongate holes 98 formed around the circumference in a spaced relationship. Header driveshaft 40 has a corresponding coupling plate 99 mounted on its inboard end, the plate 99 having a plurality of pins 100 secured around the circumference of the plate in a spaced relationship which corresponds to the holes 98 formed in the other coupling plate 97. The coupling plate 99 associated with the header drive shaft 40 is mounted thereto in a manner which permits slight axial displacement. Biasing coil springs 101 biases the coupling plate 99 axially towards the harvester coupling plate 97. Shown in FIGS. 4 and 5, both coupling plates 97,99 are protected by the dusty environment by respective covers 102,103 which nest when in the coupled position.

Operation

An example process sequence for attaching the header 18 to the harvester will now be described. As is common today, the harvester 10 is driven up to the header 18 (resting on the ground or a trailer) and, by appropriate control of the height of the feederhouse 16, the pins 29 are aligned under the hooks 28 provided in the header 18. The feederhouse 16 is lifted so as to bear the weight of the header 18 thereon and, once lifted, the latching pins 30 are extended either manually or by a known automatic latching mechanism to secure header 18 fully to the tilt frame 24.

If a latch sensor is provided, a latch signal is communicated from latch sensor 33 to the controller 34 via the data bus 90. Only then can the operator or the system operate the driveline coupler actuator 84. In the event that the latch signal is not received by the controller 34 then the actuator 84 is prevented from operating to prevent damage to the driveline coupling mechanism.

The operator, by appropriate control of a user interface device on the console 94, may then command extension of the driveline coupler actuator 84 which moves the harvester coupling plate 97 towards the header coupling plate 99 along axis x until the pins 100 either slot into holes 98 or abut against the plate 97. In the latter case slow rotation of the plate 97 by engagement of the header drive moves the holes 98 with respect to the pins 100 until they mutually engage assisted by the biasing force of the springs 101. The hydraulic pressure provided in the actuator 84 conveniently holds the coupling plates 97,99 together during operation without the need for any additional latch mechanisms.

When detachment of the header 18 is required at the end of a harvest operation the aforementioned process is carried out in reverse. Firstly, the operator commands retraction of the driveline coupler actuator 84 so as to withdraw the coupling plate 97 away from the header coupling plate 99 until separation is achieved. Only then does the controller 34 permit unlatching of the latch pins 30 and subsequent detachment of the header in the known manner.

Alternative Embodiments

Figure 10:
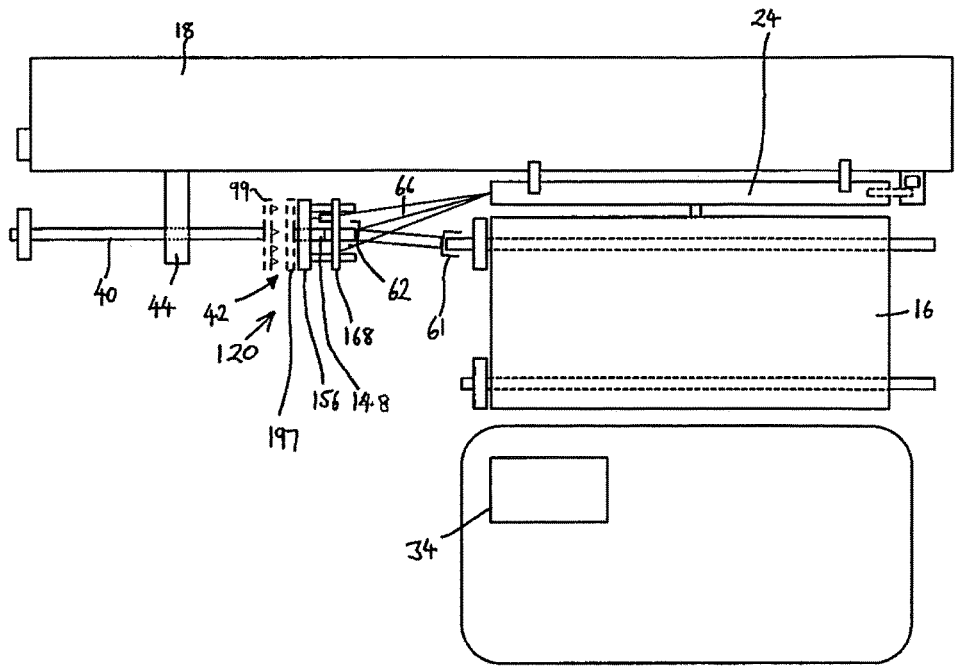
FIG. 10 is a schematic plan view of a coupling system in accordance with a second embodiment of the invention.
Figure 11:
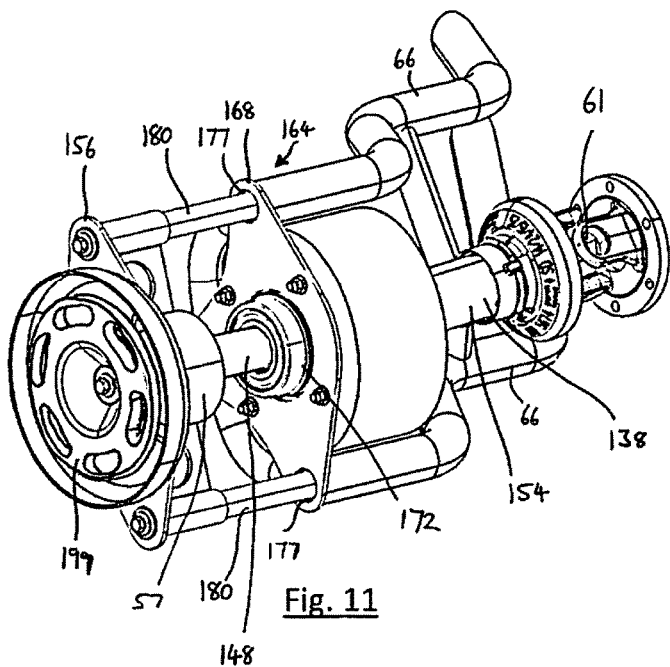
FIG. 11 is a left rear perspective view of part of the coupling system in accordance with the second embodiment of the invention showing the bearing housing in an extended (coupled) position, and, FIG. 12 is a front left perspective view of part of a sliding support assembly in accordance with a third embodiment of the invention.

FIGS. 10 and 11 illustrate an alternative drivetrain coupling system 120 to that described above with components of the above-described system 20 having the same reference numbers for convenience. Only those features which differ from the above described embodiments will be described.

The drivetrain coupling system 120 comprises a feederhouse 16, tilt frame 24 and header 18 as per the first embodiment. The drivetrain comprises a harvester driveline 138 and a header driveshaft 40, the latter being mounted in a transverse alignment on the rear side of the header 18 by a bracket arrangement 44.

The harvester driveline comprises, in this case, a first, telescopic, driveshaft 148 and a second, fixed length, driveshaft 154.

A support hub 164 comprises a plate 168 secured to outboard ends of three tubular arms 66 which connect the hub 164 to the tilt frame 24. The arms 66 are circumferentially spaced around the plate 168 at their outboard ends, and vertically spaced on the tilt frame at their inboard ends. At its centre the plate 168 comprises an aperture which receives a second bearing 172 which is secured to the plate 168 by suitable means.

Bearing housing 156 is slideably mounted to the support hub 164 by three rigid support rods 180 which are each secured at an outboard end to the bearing housing 156 and are slideably received in holes 177 cut into plate 168, the holes 177 aligning with the outboard ends of tubular arms 66 into which the rods extend in a retracted or uncoupled position.

Telescopic driveshaft 148 is supported for rotation at an outboard end by first bearing 57 and at an inboard end by second bearing 172. The telescopic driveshaft remains in alignment with the operable axis of the respective couplings 42 at all times and serves to accommodate the variable driveshaft length required for coupling and uncoupling.

The fixed length, inboard, driveshaft 154 is connected by a pair of universal joints 61,62 between the telescopic driveshaft 148 and a transverse driving stub shaft 50 which is journaled to the feederhouse 16. As in the previous embodiment, the universal joints 61,62, allow the harvester driveline to cater for movement between the coupling 42 and the feederhouse 16 as the tilt frame 24 is moved.

Although not illustrated, the actuator in this embodiment is connected between the support hub 164 and the bearing housing 156 to effect and control the variable separation there between and control the coupling/uncoupling operation.

Figure 12:
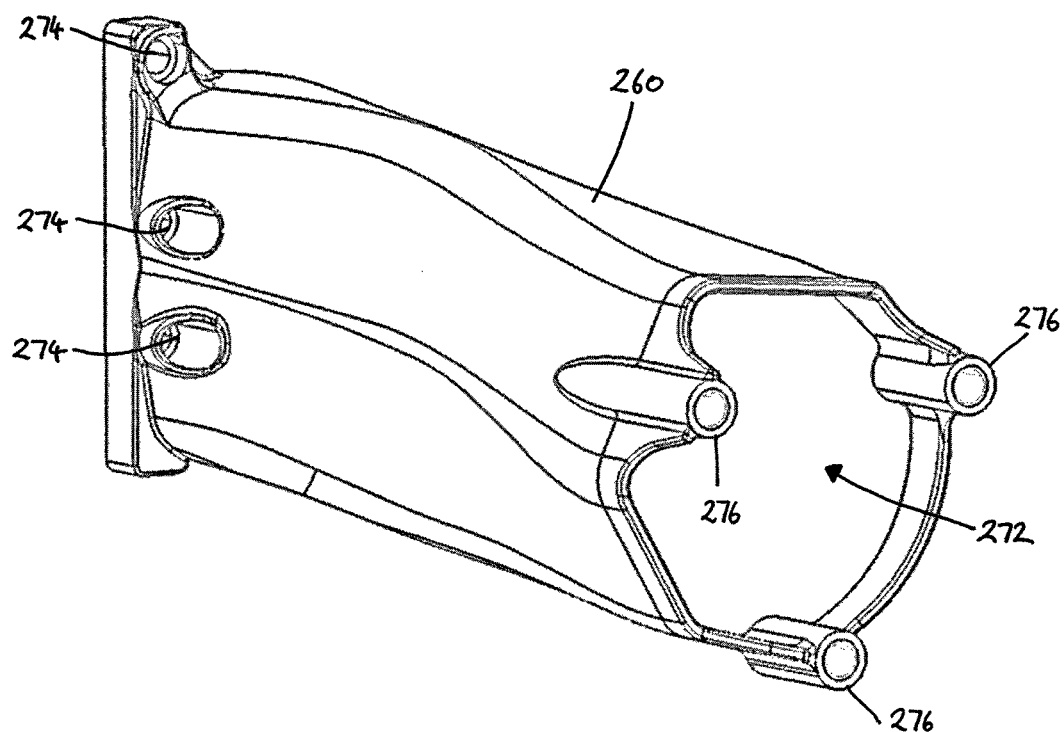

FIG. 12 illustrates yet another alternative sliding support assembly which is mounted to the tilt frame 24. In this example, the support hub 64 and three tubular arms 66 of that sliding of the above-described sliding support assembly 60 are replaced by a single cast body 260. The profile of the cast body 260 at the inboard end defines a plurality of bolt holes (three in this example) 274 for allowing the body 260 to be secured to the side of the tilt frame 24 by bolts (not shown).

The outboard end of the body 260 defines an opening 272 through which the driveshaft 48 can pass. Spaced around the opening 272, the body 260 has cast therein three bosses or bushes 276. Although not shown, it should be appreciated that respective support rods (similar to those support rods 80 described above) are slidingly received in the bosses 276, the support rods being attached to a bearing housing for supporting the outboard end of the harvester driveline.

The drivetrain coupling systems of the illustrated embodiments include a bearing housing which is mounted to a support hub in a variable-spacing sliding relationship by three rods which are fixed to the bearing housing and slide with respect to the support hub. In an alternative arrangement, the rods (or other suitable elongate members) may be fixed to the support hub whilst the bearing housing comprises holes which slide on the rods. Other telescoping arrangements which provide the required variable-spacing relationship will be envisaged by those skilled in the art.

Although described and illustrated in relation to a drivetrain coupling system which is located on the left-hand side of a harvester, it should be appreciated that such a system could be implemented on the right-hand side instead or in addition without deviating from the scope of the invention. This is especially applicable to wide headers which require a torque supply to both the left and right-hand sides.

In summary a header drivetrain coupling system comprises a harvester driveline mounted to a harvesting vehicle and a header driveshaft mounted to a detachable header. The harvester driveline is supported for rotation at an inboard end on a feederhouse and at an outboard end on a header tilt frame even when the header is detached therefrom. The harvester driveline comprises a telescopic portion which permits a coupling on the outboard end to be moved into and out of engagement with a coupling on the header driveshaft. A sliding support assembly is provided to support a bearing housing which holds the outboard end of the harvester driveline on the tilt frame. An actuator is configured to move the bearing housing with respect to the tilt frame to selectively engage and disengage the couplings.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

The invention claimed is:

1. A system for automatically coupling and uncoupling a harvesting header drivetrain comprising:
   a feederhouse mounted to a harvester main frame;
   a tilt frame mounted to a front side of the feederhouse to permit movement of the tilt frame relative to the feederhouse when in operation;
   a header being releasably mounted to the tilt frame;
   a drivetrain comprising a harvester driveline supported for rotation at an inboard end on the feederhouse and at an outboard end on the tilt frame when the header is detached from the tilt frame, and a header driveshaft driven by the harvester driveline and supplying power to the header, the header driveshaft mounted for rotation on the header;
   the outboard end of the harvester driveline supported on the tilt frame by a sliding support assembly which comprises a bearing housing which is slideably mounted to the tilt frame to permit linear movement of the bearing housing with respect to the tilt frame in a direction generally parallel to the axis of the header driveshaft, the bearing housing holding a first bearing which supports said outboard end in rotation;
   the header driveshaft and the outboard end of the harvester driveline each comprising a respective coupling which mutually engage when brought together;
   the harvester driveline comprising a telescopic driveshaft and a pair of universal joints; and,
   an actuator arranged to move the bearing housing with respect to the tilt frame to selectively engage and disengage the couplings.

2. The system according to claim 1, wherein the sliding support assembly comprises a plurality of sliding support members.

3. The system according to claim 2, wherein each sliding support member is telescopic and comprises an inner member fixed to the bearing support and being slideably received in a respective sleeve carried by the tilt frame.

4. The system according to claim 2, wherein the sliding support assembly comprises three sliding support members.

5. The system according to claim 1, wherein the sliding support assembly comprises a support hub which is mounted to the tilt frame in a fixed positional relationship therewith, wherein the bearing housing is mounted to the support hub in a variably-spaced sliding relationship.

6. The system according to claim 5, wherein the support hub comprises a central bore which receives a second bearing, wherein said telescopic driveshaft is supported at a first end by the first bearing and at a second end by the second bearing.

7. The system according to claim 6, wherein the harvester driveline further comprises an inboard driveshaft connected, by said pair of universal joints, between the telescopic driveshaft and a transverse driving stub shaft which is journaled to the feederhouse and driven by an engine.

8. The system according to claim 5, wherein the telescopic driveshaft is supported at a first end by the first bearing and at a second end by a second bearing which is mounted in a fixed positional relationship to the feederhouse, and wherein the telescopic driveshaft passes through an aperture in the support hub.

9. The system according to claim 8, wherein the telescopic driveshaft is connected at each end by said pair of universal joints.

10. The system according to claim 5, wherein the actuator is connected between the support hub and the bearing housing.

11. The system according to claim 1, wherein the tilt frame defines a crop-receiving opening which overlies a front inlet of the feederhouse, and wherein the tilt frame is pivotable around a pendulous mounting point to permit adjustment of the lateral tilt of the header, when attached, with respect to the feederhouse.

12. The system according to claim 11, wherein the tilt frame is pivotable with respect to the feederhouse around a transverse pitch axis to permit adjustment of the pitch of the header, when attached, with respect to the feederhouse.

13. The system according to claim 5, wherein the support hub is mounted to the tilt frame by a plurality of arms.

14. A system for automatically coupling and uncoupling a harvesting header drivetrain comprising:
   a feederhouse mounted to a harvester main frame;
   a tilt frame mounted to a front side of the feederhouse to permit movement of the tilt frame relative to the feederhouse when in operation;
   a header being releasably mounted to the tilt frame;
   a drivetrain comprising a harvester driveline supported for rotation at an inboard end on the feederhouse and at an outboard end on the tilt frame when the header is detached from the tilt frame, and a header driveshaft driven by the harvester driveline and supplying power to the header, the header driveshaft being mounted for rotation on the header;
   the outboard end of the harvester driveline being supported on the tilt frame by a sliding support assembly comprising a support hub mounted to the tilt frame by a plurality of arms, in a fixed positional relationship to the tilt frame, and a bearing housing which is slideably mounted to the tilt frame to permit linear movement of the bearing housing with respect to the tilt frame in a direction generally parallel to the axis of the header driveshaft, the bearing housing holding a first bearing which supports said outboard end in rotation, wherein the bearing housing is mounted to the support hub in a variably-spaced sliding relationship;
   the header driveshaft and the outboard end of the harvester driveline each comprising a respective coupling which mutually engage when brought together;
   the harvester driveline comprising a telescopic driveshaft and a pair of universal joints; and
   an actuator arranged to move the bearing housing with respect to the tilt frame to selectively engage and disengage the couplings.

15. A system for automatically coupling and uncoupling a harvesting header drivetrain comprising:
   a feederhouse mounted to a harvester main frame;
   a tilt frame mounted to a front side of the feederhouse to permit movement of the tilt frame relative to the feederhouse when in operation;
   a header being releasably mounted to the tilt frame;
   a drivetrain comprising a harvester driveline supported for rotation at an inboard end on the feederhouse and at an outboard end on the tilt frame when the header is detached from the tilt frame, and a header driveshaft driven by the harvester driveline and supplying power to the header, the header driveshaft being mounted for rotation on the header;
   the outboard end of the harvester driveline being supported on the tilt frame by a sliding support assembly which comprises a bearing housing which is slideably mounted to the tilt frame to permit linear movement of the bearing housing with respect to the tilt frame in a direction generally parallel to the axis of the header driveshaft, the bearing housing holding a first bearing which supports said outboard end in rotation;
   the header driveshaft and the outboard end of the harvester driveline each comprising a respective coupling which mutually engage when brought together;
   the harvester driveline comprising a telescopic driveshaft and a pair of universal joints; and,
   an actuator arranged to move the bearing housing with respect to the tilt frame to selectively engage and disengage the couplings; and
   a latch mechanism to latch the tilt frame to the header, a latch sensor to detect when the latch mechanism is successfully engaged, and a controller for controlling the actuator, wherein the controller is configured to receive a latch signal from the latch sensor, and wherein the controller commands extension of the actuator only when the latch signal is received.

* * * * *